United States Patent
Austin et al.

(10) Patent No.: US 8,681,005 B2
(45) Date of Patent: Mar. 25, 2014

(54) RFID READER WITH MOTION DETECTION

(75) Inventors: Timothy B. Austin, Stony Brook, NY (US); Mark W. Duron, East Pastchogue, NY (US); Miklos Stern, Woodmere, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 386 days.

(21) Appl. No.: 12/892,885

(22) Filed: Sep. 28, 2010

(65) Prior Publication Data

US 2012/0075101 A1    Mar. 29, 2012

(51) Int. Cl.
*G08B 13/14*    (2006.01)

(52) U.S. Cl.
USPC ...... 340/572.4; 340/552; 340/565; 340/691.6

(58) Field of Classification Search
USPC ........ 340/541, 552, 565, 572.1, 572.4, 573.1, 340/573.4, 691.6, 693.3, 10.1; 705/14.58, 705/14.49–14.67; 40/493, 508
See application file for complete search history.

(56) References Cited

U.S. PATENT DOCUMENTS

| | | | |
|---|---|---|---|
| 6,150,948 A | 11/2000 | Watkins | |
| 6,661,343 B1 | 12/2003 | Rocci | |
| 7,830,259 B2 * | 11/2010 | Walker et al. | 340/572.1 |
| 8,284,061 B1 * | 10/2012 | Dione | 340/572.1 |
| 2004/0103028 A1 * | 5/2004 | Littman et al. | 705/14 |
| 2004/0160306 A1 | 8/2004 | Stilp | |
| 2004/0201539 A1 | 10/2004 | Yewen | |
| 2008/0061976 A1 | 3/2008 | Shafer | |
| 2008/0136356 A1 * | 6/2008 | Zampini et al. | 315/308 |
| 2009/0309748 A1 | 12/2009 | Elgort et al. | |
| 2010/0057563 A1 * | 3/2010 | Rauber et al. | 705/14.53 |
| 2010/0262460 A1 * | 10/2010 | Brown et al. | 705/14.66 |
| 2011/0000963 A1 * | 1/2011 | Mercado et al. | 235/383 |
| 2011/0060652 A1 * | 3/2011 | Morton | 705/14.58 |

OTHER PUBLICATIONS

International Search Report and Written Opinion for International Application No. PCT/US2011/049293 mailed on Oct. 12, 2011.

* cited by examiner

*Primary Examiner* — Thomas Mullen

(74) *Attorney, Agent, or Firm* — Brian M. Mancini

(57) ABSTRACT

A technique for operating a Radio Frequency Identification, RFID, reader with motion detection includes detecting a motion in proximity to the RFID reader, and triggering the RFID reader to read any tags in proximity to the RFID reader in response to detecting a motion in proximity to the RFID reader. Detecting a motion can also generate a change in digital signage, or communicate information about read tags to a local area network. Operating this system only when motion is detected saves battery life.

9 Claims, 2 Drawing Sheets

RFID READER WITH MOTION DETECTION

FIELD OF THE DISCLOSURE

The present invention relates generally to Radio Frequency Identification (RFID) readers and more particularly to an RFID reader that includes a motion detector.

BACKGROUND

At present, there are many techniques for the electronic monitoring of the movement of stock, which can be used in many different commercial scenarios, such as inventory management in a retail establishment or store. These monitoring techniques include the scanning of any one of a barcode printed on an item, an Electronic Article Surveillance (EAS) tag affixed to the item, Radio Frequency Identification (RFID) tag embedded in the item, and the like. These monitoring devices can be located at checkout counters or can be distributed throughout the store, where they may be augmented with digital signage to provide customer with information about the devices or items scanned by the devices.

Maintaining an accurate inventory of a store is extremely important to avoid missed sales due to the wrong item being present or not enough of the correct item being available to the customers. However, conventional inventory tracking (e.g. subtracting sold items from the items on display or manual stock taking) can be time consuming and prone to a number of types of error, including: shrinkage (theft), misplaced stock (items in an incorrect location) and incorrect measurement (recording five red XL sweaters rather than two XL's, two L's and an XXL).

In addition, for those monitoring devices that are distributed throughout the store, any hard-wiring of digital signage or RFID readers requires a semi-static layout of devices which reduces the ability to quickly rearrange a store layout in response to changes in customer behavior or store merchandise. In addition, for those monitoring devices that operate on batteries, the battery life in wireless devices is strongly influenced by how often a sign updates or an RFID reader reads.

Accordingly, there is a need for a battery-powered monitoring system that could be put in place which also provides a real time inventory and reacts to customer and product movement. In this way, the store would become more user friendly (greater customer interaction and less missed sales) at reduced costs (less need to check inventory).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
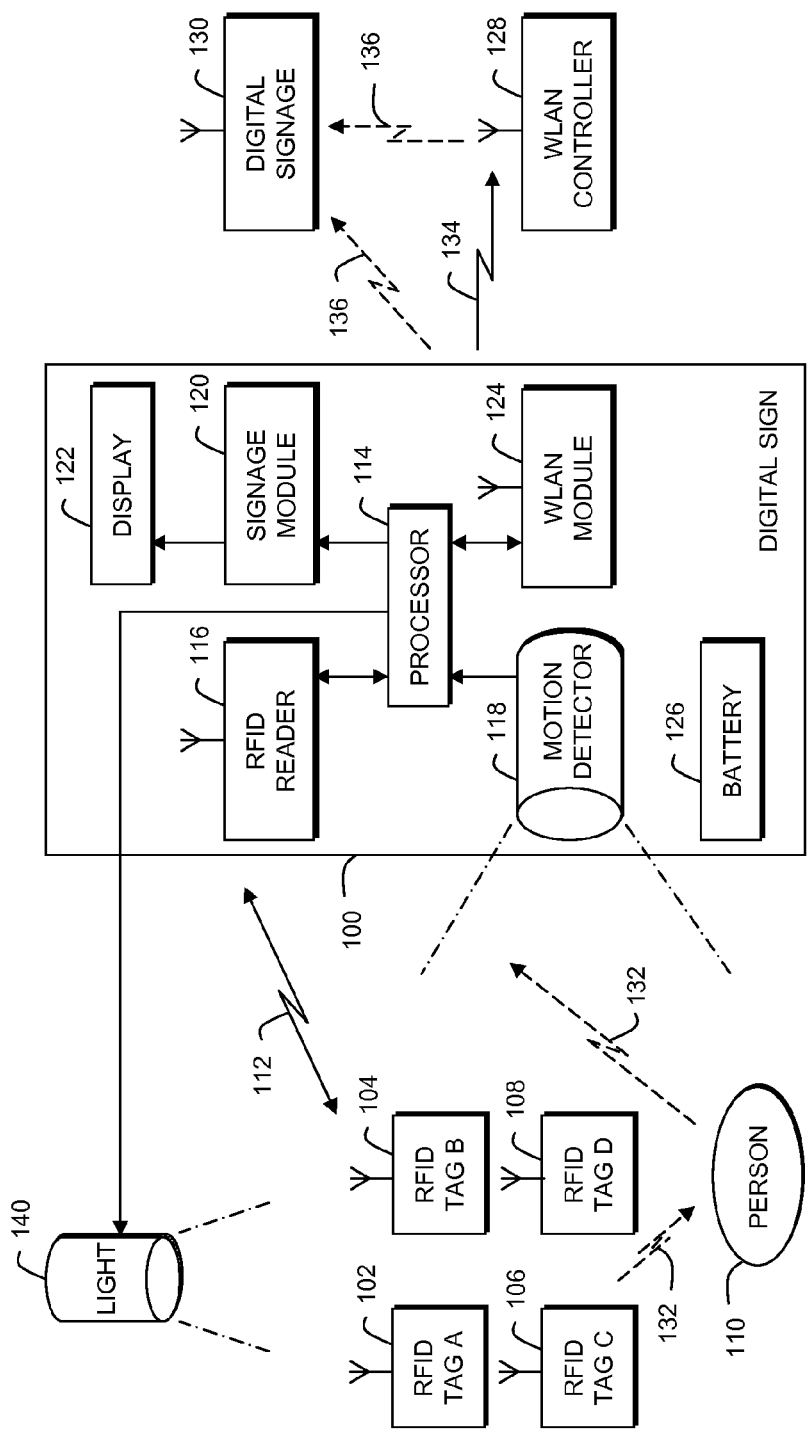
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described that provides a battery-powered monitoring system that provides a real time inventory and reacts to customer and product movement. A wireless network of battery powered devices combining motion detection with a sign and/or RFID reader (see FIG. 1) where motion in one part of the network is used to trigger changes to the signage and/or RFID reads at the same or another location within the network. Using motion detection to trigger a change in signage means that changes in a display occur when somebody is there to see them. Using motion detection to trigger an RFID "read" means that a read occurs when something is happening or has happened to a population of tags in proximity to the reader. In both cases battery power is conserved until it is required.

FIG. 1 is a block diagram depiction of a system powered by a battery 126 that includes an RFID reader 116 and motion detector 118 controlled by a processor 114. It is envisioned that this system be incorporated into a digital sign 100 that includes a display 122 operated by the processor 114 through a signage module 120. In order to conserve battery power, the display can be a low-power, reflective, bi-stable display technology (such as e-ink or Cholesteric systems). Optionally, the system can include a wireless Local Area Network module 124 to communicate RFID information to a network controller 128 or receive information from the network controller to show on the display 122.

The wireless communication network can include local and wide-area networks, or other IEEE 802.11 wireless communication system. However, it should be recognized that the present invention is also applicable to other wireless communication systems. For example, the description that follows can apply to one or more communication networks that are IEEE 802.xx-based, employing wireless technologies such as IEEE's 802.11, 802.16, or 802.20, modified to implement embodiments of the present invention.

Referring back to FIG. 1, there is shown a block diagram of various entities adapted to support the inventive concepts of the preferred embodiments of the present invention. Those skilled in the art will recognize that FIG. 1 does not depict all of the equipment necessary for system to operate but only those system components and logical entities particularly relevant to the description of embodiments herein. For example, RFID readers, motion detectors, wireless network entities, and digital signs can all includes separate processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the inventory monitoring aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

Referring back to FIG. 1, a motion detector 118 operates to detect motion in proximity to the RFID reader 116 or digital sign 100. The motion detector 118 can detect a person 110 moving within range of the reader or sign, or even items 102-108 that are being moved or carried by that person 110 within range of the reader or sign. Upon detection of any motion by any object 102-110, the motion detector 118 sends a detection signal to the processor 114.

The processor can take different actions in response to a detection of motion. In one embodiment, the processor 114 can generate a change in digital signage when the motion is detected in proximity to the RFID reader. For example, upon detection of a person 110, the processor can turn on the display 122 so that the person can be presented with information, such as the prices of items 102-108, whereas if there is no nearby motion the display can be turned off to save battery life. In another example, information on the display 122 can be changed to provide information about a particular item (e.g. item D 108) that the person 110 might be carrying or might be handling on a table near the display. In addition, movement at a location can be used to update digital signage to influence future customer actions. For example, customers moving at one location can be diverted to a different location by a sign advertising a more exclusive brand. In another example, detecting the movement of a tag at a location can also be used to further enhance a change in the local digital signage, such as detecting that a tagged item that a person is already carrying or handling is an item having supplementary information associated with it, such as how to wear or accessorize an article of clothing for example, wherein the processor can direct the sign to display different ways to wear the item of clothing associated with the moving tag or directions to other products that might complement it. In another example, people as well as items can be associated with RFID tags (e.g. employee identification, customer loyalty cards, event tickets, mobile equipment), and this information can be used to control the way in which the digital sign responds, such as: a) reading a user's VIP card in the vicinity resulting in a personalized message for that card holder on nearby signage; 2) detecting employees such as members of night staff and no customer loyalty cards resulting in a cessation of RFID reads for a certain time period; 3) detecting a loyal customer with a certain buying habits resulting in a change in signage to highlight certain items; and 4) detecting a forklift truck which can trigger a warning message on nearby signage and a cessation of RFID reads for a certain time period.

In another embodiment, upon detection of motion and following multiple reads of a tag in motion, the processor can use the change in phase of the signal from the moving tag to decide whether the tag is moving towards or away from the reader. This information can then be used in later decision making; for example, if motion is detected and the only direction of tags moving in the vicinity is away from the reader, the display remains turned off to save battery life.

In another embodiment, the digital sign 100 can be operated to move or rotate upon a detection of motion nearby and a change in the presence of RFID tags 102-108. In this case, upon a detection of motion, the processor 114 can trigger the RFID reader to determine if there has been a change in the local population of RFID tags. If so, the processor directs the digital sign 100 to face or move towards the source of the detected motion. In particular, the digital sign could always face a user that is walking towards or by the digital sign. This can be accomplished through trilateration or triangulation between different motion detectors and/or RFID readers, knowing a sequence of motion or RFID detection along with known locations of motion detectors or RFID readers, and/or using Doppler detection of an RFID reader 116 to determine a tagged item's motion vector.

In another embodiment, upon a detection of motion and the reading of a particular type of RFID tag, the processor can trigger a light 140 to highlight particular items or products 102-108 based on the type of RFID tag. For example, if the tag belongs to a shopping cart, it can be assumed that there is a user pushing the cart, and the light 140 can be triggered to highlight nearby items. In another example, if the tag belongs to a particular item in a shopping cart, the light can be triggered to highlight nearby items that are associated with that item. In yet another example, if the tag belongs to an employee badge, then no action would be taken, to save lighting costs.

In another embodiment, the processor 114 can trigger the RFID reader 116 to read 112 any RFID tags 102-108 in proximity to the RFID reader in response to the motion detector 118 detecting a motion in proximity to the RFID reader. This can be used to inventory these items for example. There can be several scenarios in this embodiment to ensure an accurate inventory.

In a first scenario, the RFID reader 116 can periodically attempt to read 112 the tags of local items A-D 102-108. Depending on how the items are stacked, it may be the case that one or more of the tags (e.g. tag C 106) is occluded from the reader, and the reader can only read tags A, B, D 102, 104, 108.

In a second scenario, the RFID reader 116 waits until the processor 114 provides a trigger that motion of any object 102-110 has been detected by the motion detector 118. In this scenario, it may be that the person 110 is picking up and examining the items 102-108 (i.e. fluffing), which may now reveal item C 106 that was previously occluded, and therefore reader 116 is able to read 112 all tags A-D 102-108.

In a third scenario, the RFID reader 116 again waits until the processor 114 provides a trigger that motion of any object 102-110 has been detected by the motion detector 118. In this scenario, even if no items are moved it may be that the presence of the person 110 provides a reflected or multipath signal 132 from occluded items (e.g. tag C 106) such that the reader can read the occluded items.

In a fourth scenario, the RFID reader 116 again waits until the processor 114 provides a trigger that motion of any object 102-110 has been detected by the motion detector 118. However, in this scenario, the processor first checks to see if the signal from the motion detector remains above a threshold for a predefined amount of time (indicating sufficient local activity), and then delays the trigger to the reader 116 a predetermined amount of time after the motion detector 118 stops detecting motion in proximity to the RFID reader. This scenario gives the person 110 a chance to rearrange or remove any of the items A-D 102-108, and once the person 110 has left the proximity if the reader (i.e. no more motion is detected), the processor can trigger the RFID reader 116 to read 112 the tags to see if any tags are now missing, or any previously occluded tags are now revealed. In either case the reader now has a current inventory of items. Over time, counting the inventory at a location for the above scenarios, which either move items at that location or change the surrounding environment can be used to confirm the inventory at that location.

It is envisioned that all of the above scenarios can be used in concert, in order to provide a more accurate picture of the actual inventory on hand at any one location. In other words, each time the reader 116 reads the local tags, this is reported 134 via the processor 114 and wireless module 124 to a local area network controller 128 to which it is attached so that the controller can keep track of inventory. Each of the above scenarios may report different tags at each read. The controller 128 can simply use the union of the set of tags read at each scenario to monitor inventory. For example, if the first scenario reads tags A, B and D, and the second and third scenarios read tags A, B, C and D, then the controller knows that there is a full set of items A-D. At a later time, if the fourth scenario reads only tags B-D, it may be that item A has been removed by the person. The above scenarios can be repeated over time, to gain a more accurate view of the inventory. In particular, the controller could monitor a change in the identities of RFID tags from those identities that were read during a previous reading of RFID tags in proximity to the RFID reader.

While it may be difficult to get accurate reads of RFID tags when items are closely packed together, it is significantly easier to read smaller numbers of tags as they arrive at or leave a location by reading the area surrounding the location. The accuracy of this method is enhanced when a store has a population of RFID readers: if an item that was previously read near location E is then read near location F some distance away then it can be assumed that the item is no longer at location E and that item can be removed from the inventory for location E, thereby further increasing inventory accuracy. By combining the data from RFID tag tracking of areas surrounding locations of item storage with the cumulative counts of tags made at the locations during and following nearby movement, an accurate real time inventory which includes the location of the items can be maintained. Therefore, the present invention can have an advantage by using a motion at location E to trigger one of the other RFID readers (e.g. reader F) to read any tags in proximity to reader F when the motion is detected in proximity to the reader E. This can be done by having the processor 114 at location E give triggering instructions for the WLAN module 124 to send 136 to other digital signage 130 including an RFID reader at location F, wherein the triggering instructions can be sent either directly to sign 130 or through the WLAN controller 128 to the sign 130. Similarly, the sign 100 at location E could be used to effect a change in the other sign 130 at location F.

Detecting a high or low incidence of movement or changing inventory at any one location also provides useful information to a store owner. If a motion detector 118 indicates a high incidence or duration of motion at a location, this indicates a high traffic area, where the store owner may wish to place impulse-buy items. If the system detects a correlation of high motion detection and a high amount of stock turnover (i.e. the removal of RFID-tagged items from the proximity of the RFID reader) at one location, this indicates to the owner that restocking might be needed. If the system detects a low incidence of motion or low turnover of stock at a particular location, then the store owner may wish to place items at that location on sale to increase traffic/turnover.

Figure 2:
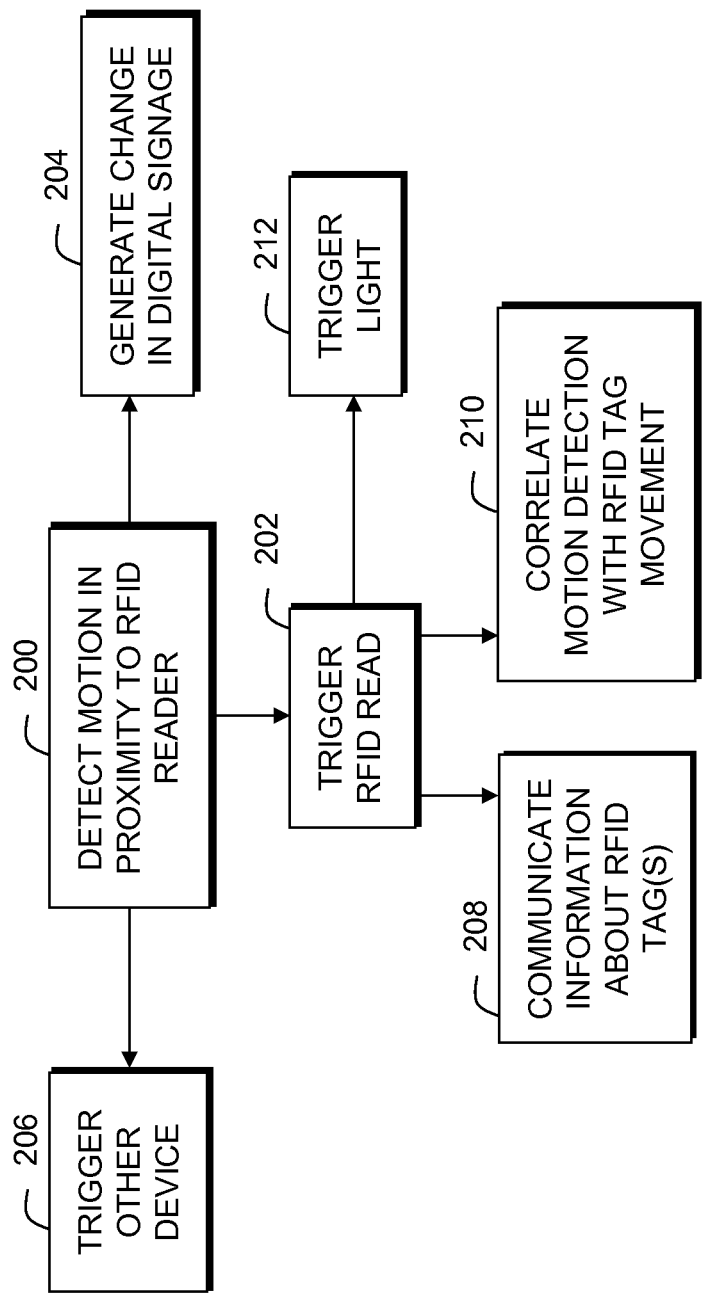
FIG. 2 is a flowchart of a method, in accordance with some embodiments of the present invention.

FIG. 2 illustrates a flowchart of a method for operating an RFID reader with motion detection, in accordance with the present invention.

The method includes detecting 200 a motion in proximity to the RFID reader. The motion can be of a person or of an item that may be RFID-tagged.

The method includes triggering 202 the RFID reader to read any tags in proximity to the RFID reader when the motion is detected in proximity to the RFID reader. It may be that motion detected near one RFID reader can be used to trigger 206 an RFID read or digital signage change in a completely different device, not connected with the motion detector that is detecting the motion. That can be accomplished by wirelessly communicating with this other device to trigger a read or sign change. For example, a person walking through a store will set off a motion detector where the person's direction of travel can be discerned as previously described, which in turn directs a change in a sign in a direction ahead of where the person is walking. In one embodiment, triggering occurs a predetermined time after the detecting 200 stops detecting motion in proximity to the RFID reader.

The method includes generating 204 a change in digital signage when the motion is detected in proximity to the RFID reader. This can include turning the sign on/off, changing information displayed on the sign, such as information relating to an item being moved, or moving the digital signage upon a detection of motion and a change in the presence of RFID tags.

Optionally, the method can include triggering 212 a light depending on a type of RFID tag that is read.

The method can include wirelessly communicating 208 information about RFID tags read by the RFID reader to a local area network controller. This information can include a change in the identities of RFID tags from those that were read during a previous reading of RFID tags in proximity to the RFID reader, e.g. detecting that an item has been removed when the motion disappears.

The method can include correlating 210 incidences of motion detection with the removal of RFID-tagged items from the proximity of the RFID reader.

Advantageously, the system and method described herein enables a store to actively manage the flow of its customers with signage that reacts to their movement, provide additional selling information to their customers while they are shopping, maintain an accurate real time inventory without the need for employees to manually perform checks of stock, maximize the ratio of inventory accuracy to number of reads, and optimize the powering of readers/signage with an associated improvement in battery life by the use of motion detection that not only limits battery usage, but it also limits RF traffic and RF collisions, and makes the RFID readers more efficient; all in a system made up of devices that can be moved about the store at will.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A digital sign comprising:
   a first Radio Frequency Identification (RFID) reader;
   a wireless communication transceiver operable on a local area network;
   a motion detector; and
   a processor coupled to the motion detector, the wireless communication transceiver, and the first RFID reader, the processor operable to trigger the first RFID reader to read any RFID tags in proximity to the first RFID reader in response to the motion detector detecting a motion in proximity to the first RFID reader,
   wherein the first RFID reader is part of the local area network that includes other RFID readers surrounding the first RFID reader, and wherein the processor is operable to direct the transceiver to communicate with those other RFID readers in the local area network in order to trigger those other RFID readers to read any RFID tags in proximity to those other RFID readers following motion being detected in proximity to the first RFID reader to detect whether a tag previously read near the first RFID reader can subsequently be read by one of those other RFID readers, whereupon a network controller in communication with the one of those other RFID readers will remove an item associated with that RFID tag from an inventory at a location of the first RFID reader.

2. The digital sign of claim 1, further comprising a light coupled with the processor, such that the light can be triggered by the processor to highlight an object when an RFID tag affixed to the object is read by the first RFID reader.

3. The digital sign of claim 1, wherein the processor is operable to generate a change in the digital sign when the motion detector detects motion in proximity to the first RFID reader, wherein the change provides information diverting a customer to a more exclusive brand than that of RFID-tagged items near the first RFID reader.

4. The digital sign of claim 1,
   wherein the processor is operable to generate a change in the digital sign when the motion detector detects motion in proximity to the first RFID reader, wherein the change provides directions to other products that can complement the RFID-tagged items near the first RFID reader.

5. The digital sign of claim 1, wherein the processor can keep a cumulative count and identities of tags as they are read and if there is a change in the cumulative count and identities of the RFID tags from those that were read during a previous reading of the RFID tags in proximity to the first RFID reader, the processor is further operable to direct the wireless communication transceiver to wirelessly communicate information about the RFID tags read by the first RFID reader to a local area network controller.

6. A digital sign comprising,
- a Radio Frequency Identification (RFID) reader;
- a wireless communication transceiver operable on a local area network;
- a motion detector; and
- a processor coupled to the motion detector, the wireless communication transceiver, and the RFID reader, the processor operable to trigger the RFID reader to read any RFID tags in proximity to the RFID reader in response to the motion detector detecting a motion in proximity to the RFID reader,
- wherein a change in phase of a signal from the RFID tags read in proximity to the RFID reader is used to detect whether those RFID tags are moving towards or away from the RFID reader, wherein if the only direction of all the tags read in proximity to the RFID reader is moving away from the RFID reader, a display of the digital sign is turned off.

7. A digital sign comprising,
- a Radio Frequency Identification (RFID) reader;
- a wireless communication transceiver operable on a local area network;
- a motion detector; and
- a processor coupled to the motion detector, the wireless communication transceiver, and the RFID reader, the processor operable to trigger the RFID reader to read any RFID tags in proximity to the RFID reader in response to the motion detector detecting a motion in proximity to the RFID reader,
- wherein if the processor detects that one of the RFID tags belongs to an employee and not a customer, the processor will direct the RFID reader to cease reading any RFID tags for a predetermined time period.

8. A digital sign comprising,
- a Radio Frequency Identification (RFID) reader;
- a wireless communication transceiver operable on a local area network;
- a motion detector; and
- a processor coupled to the motion detector, the wireless communication transceiver, and the RFID reader, the processor operable to trigger the RFID reader to read any RFID tags in proximity to the RFID reader in response to the motion detector detecting a motion in proximity to the RFID reader,
- wherein if the processor detects that one of the RFID tags belongs to a forklift, the processor will direct the RFID reader to cease reading any RFID tags for a predetermined time period and will direct the digital sign to display a warning.

9. A digital sign comprising,
- a Radio Frequency Identification (RFID) reader;
- a wireless communication transceiver operable on a local area network;
- a motion detector; and
- a processor coupled to the motion detector, the wireless communication transceiver, and the RFID reader, the processor operable to trigger the RFID reader to read any RFID tags in proximity to the RFID reader in response to the motion detector detecting a motion in proximity to the RFID reader,
- wherein if the processor detects that one of the RFID tags belongs to a particular item in a shopping cart and is not an employee badge, the processor will direct a light to be triggered to highlight nearby items that are associated with that particular item in the shopping cart.

\* \* \* \* \*